United States Patent [19]
Amano et al.

[11] Patent Number: 5,653,406
[45] Date of Patent: Aug. 5, 1997

[54] NACELLE APPARATUS FOR AN AIRPLANE

[75] Inventors: Kanichi Amano, Tokyo; Yasuhiro Tani, Utsunomiya, both of Japan

[73] Assignees: Fuji Jukogyo Kabushiki; Japan Aircraft Development, both of Tokyo-to, Japan

[21] Appl. No.: 253,314

[22] Filed: Jun. 3, 1994

[30] Foreign Application Priority Data

Jun. 7, 1993 [JP] Japan ................. 5-030341

[51] Int. Cl.$^6$ ......................................... B64D 27/00
[52] U.S. Cl. ................. 244/130; 244/53 R; 244/54
[58] Field of Search ........................ 244/130, 53 R, 244/54, 1 N; 181/213, 220; 239/127.3, 265.13; 60/226.1

[56] References Cited

U.S. PATENT DOCUMENTS

| | | | |
|---|---|---|---|
| 4,043,522 | 8/1977 | Vetter | 244/54 |
| 4,171,786 | 10/1979 | Krenz | 244/54 |
| 4,410,150 | 10/1983 | Lahti | 244/130 X |
| 4,437,627 | 3/1984 | Moorehead | 244/53 R |
| 4,449,683 | 5/1984 | Gratzer et al. | 244/130 |
| 4,466,587 | 8/1984 | Duja et al. | 244/130 X |
| 4,471,925 | 9/1984 | Kunz | 244/130 |
| 4,799,633 | 1/1989 | Lahti et al. | 244/130 |
| 4,801,058 | 1/1989 | Mullins | 244/54 X |
| 4,940,196 | 7/1990 | Lardellier | 244/54 |

FOREIGN PATENT DOCUMENTS

| | | | |
|---|---|---|---|
| 1436411 | 3/1966 | France | 244/1 N |
| 523357 | 7/1940 | United Kingdom | 244/130 |
| 2083420 | 3/1982 | United Kingdom | 244/54 |

*Primary Examiner*—Galen L. Barefoot
*Attorney, Agent, or Firm*—Beveridge, DeGrandi, Weilacher & Young, LLP

[57] ABSTRACT

A nacelle apparatus for an airplane of the type having nacelles for jet engines suspended under a wing via pylons includes lip-shaped small wings corresponding to the nacelles for the jet engines. Each lip-shaped small wing extends from the upper trailing edge of each nacelle to the opposite sides of a pylon. The nacelle apparatus assures that lift/drag properties of the nacelle apparatus can be improved by reducing a magnitude of drag induced by aerodynamic interference of the main wing with the nacelle.

23 Claims, 4 Drawing Sheets

NACELLE APPARATUS FOR AN AIRPLANE

BACKGROUND OF THE INVENTION

1. Field of the Invention

The present invention relates to a nacelle apparatus for an airplane of the type having nacelles for jet engines mounted under a wing, particularly to a nacelle apparatus which has improved lift/drag properties brought about by reducing a magnitude of drag due to aerodynamic interference of the wing with each nacelle during flying of the airplane at high speed.

2. Description of the Related Art

To facilitate understanding the present invention, a typical conventional nacelle apparatus for an airplane of the foregoing type will be described below with reference to FIG. 6.

As shown in the drawing, the airplane of the type having jet engines mounted under a wing 1 includes nacelles 3 which are suspended from the wing 1 via pylons 2. However, it has been already known that a lift/drag ratio of each jet engine is reduced under the influence induced by aerodynamic interference of the wing 1 with the nacelles 3 when each nacelle 3 is located excessively near to the main wing 1.

On the other hand, in the case of this type airplane having jet engines each having a large bypass ratio mounted from the wing, it is required that landing gears and pylons are elongated. In this case, since the weight of the airplane is unavoidably increased, it is necessary that the elongation of the landing gears and the pylons is suppressed. On the contrary, however, when the length of each pylon is shortened, a magnitude of interference drag induced by aerodynamic between the wing and the nacelle is correspondingly increased. In addition, shortening of the length of each landing gear is limitatively restricted from the viewpoint of safety because of a necessity for maintaining a necessary clearance between the lower surface of each nacelle and the ground surface. In connection with the conventional nacelle apparatus constructed in the above-described manner, a technical measure for suspending the nacelle under the wing with a sufficiently long distance kept therebetween has been generally taken because no occurrence of aerodynamic interference of the wing with the nacelle is significantly taken into account. In addition, another technical measure for reducing a magnitude of aerodynamic resistance induced by the interference of the wing with each nacelle by correctively modifying the contour of each nacelle cowl has been developed for practical use in association with a nacelle apparatus as disclosed in an official gazette of U.S. Pat. No. 4,799,633.

However, since the aforementioned technical measure for mounting the nacelles under the wing with a sufficiently long distance kept therebetween induces substantial increase of the weight of the airplane due to elongation of the landing gears and pylons, it is not preferable to practically employ the aforementioned technical measure.

With the last-mentioned technical measure for correctively modifying the contour of the nacelle cowl, there arises a necessity for changing the contour of the whole nacelle from a simple cylindrical contour to a complicated one. Due to the foregoing necessity, it is difficult to fabricate the optimum nacelle apparatus, resulting in a fabrication cost of the nacelle apparatus being undesirably increased.

SUMMARY OF THE INVENTION

The present invention has been made in consideration of the aforementioned background.

An object of the present invention is to provide a nacelle apparatus for an airplane of the type having nacelles for jet engines suspended under a wing wherein the nacelle apparatus assures that lift/drag properties of each jet engine can be improved, without any necessity for changing the contour of each nacelle, by reducing an intensity of aerodynamic drag induced by interference between the wing and the nacelle when the latter is provided below to the wing at a position located nearer to the wing as compared with a conventional nacelle apparatus.

The present invention provides a nacelle apparatus for an airplane of the type having nacelles for jet engines suspended below the wing via pylons wherein each nacelle is equipped with a lip-shaped small wing in such a manner as to allow the lip-shaped small wing to extend from the upper trailing edge of the nacelle to the opposite sides of each pylon.

With the nacelle apparatus constructed in the above-described manner, a length of the lip-shaped small wing as measured rearward of the trailing edge of a fan cowl is determined to assume a value representing the length of a wing chord as measured at the position of mounting of the nacelle multiplied by a numeral ranging from about 0.12 or more to 0.25, while a width of the lip-shaped small wing as measured at the trailing edge of the fan cowl is determined to assume a value representing a diameter of the fan cowl as measured at the position coincident with an exhaust jet opening portion of each engine multiplied by a numeral ranging from about 0.5 or more to that representing the foregoing diameter.

Usually, the lip-shaped small wing has a curved sectional contour which extends in the concentric relationship relative to the nacelle.

Alternatively, the lip-shaped small wing may have a substantially flat sectional contour which extends in parallel with the main wing. Thus, the invention features a small wing that defines a flat plane and rearwardly extends from a trailing edge of the fan cowl.

According to the present invention, the nacelle apparatus assures that a mixture gas consisting of an air flowing along the lower surface of the main wing and an exhausting jet from each engine nacelle is caused to properly flow, resulting in a magnitude of aerodynamic drag against the interference of the wing with the nacelles being reduced by the small size wings each of which extends from the upper trailing edge of the nacelle to the opposite sides of each pylon.

Other objects, features and advantages of the present invention will become apparent from reading of the following description which has been made in conjunction with the accompanying drawings.

DESCRIPTION OF THE PREFERRED EMBODIMENT

The present invention will now be described in detail hereinafter with reference to the accompanying drawings which illustrate a preferred embodiment thereof.

Figure 1:
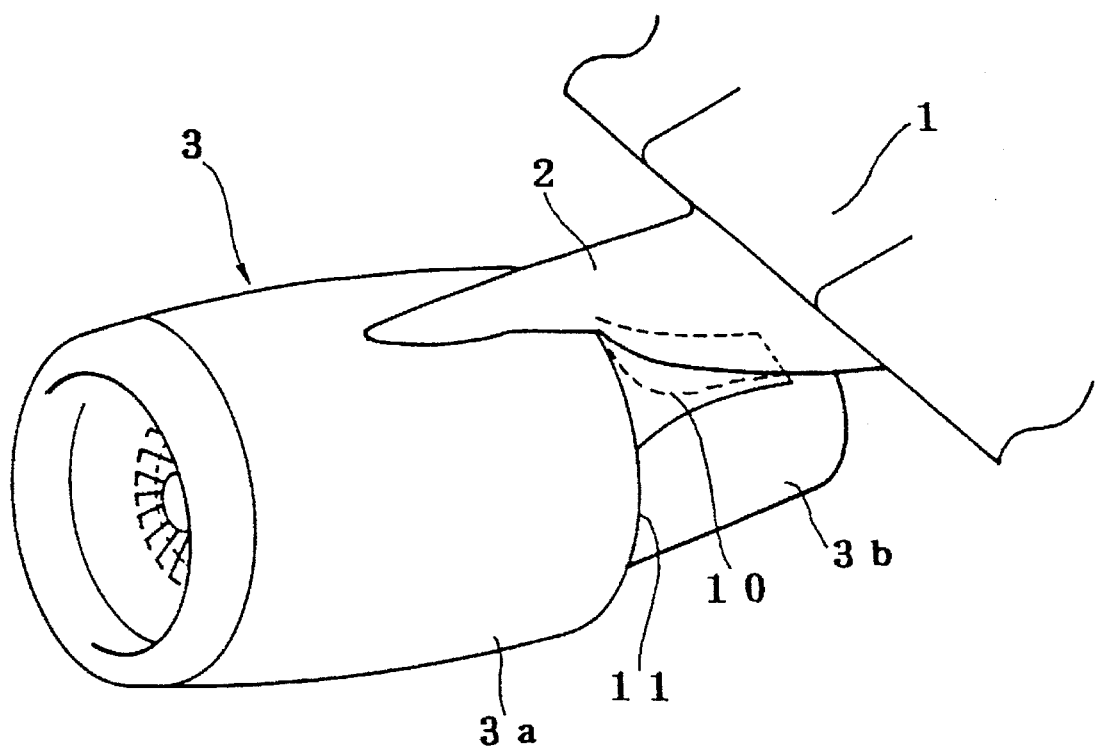
FIG. 1 is a perspective view of a nacelle apparatus for an airplane constructed according to an embodiment of the present invention.
Figure 2:
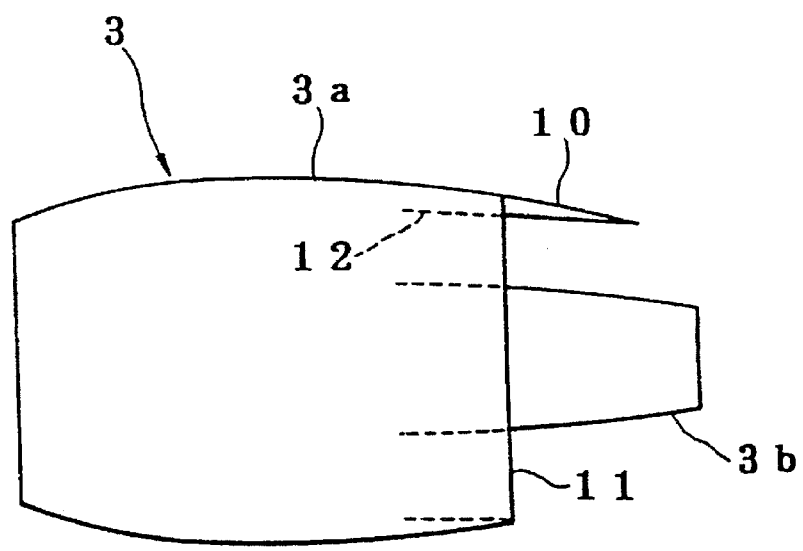
FIG. 2 is a side view of the nacelle apparatus shown in FIG. 1.
Figure 6:
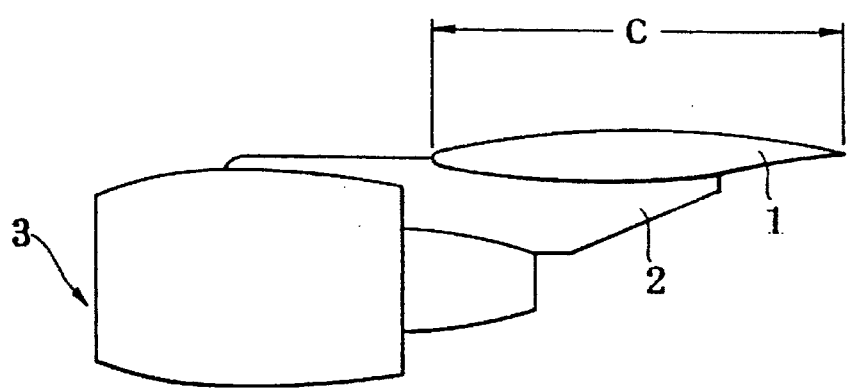
FIG. 6 is a side view of a conventional nacelle apparatus for an airplane.

Same components shown in FIG. 1 and FIG. 2 as those shown in FIG. 6 are represented by same reference numerals. Repeated description of these components will not be required for the purpose of simplification.

In FIG. 1, reference numeral 10 designates a lip-shaped small wing. This lip-shaped small wing 10 is arranged in such a manner as to extend from a trailing edge 11 of a fan cowl 3a for a nacelle 3 to the opposite sides of a pylon 2. The lip-shaped small wing 10 is contoured in such a manner that the upper surface of the lip-shaped small wing 10 gently slopes to reach the upper surface of the fan cowl 3a and the lower surface of the same likewise gently slopes to reach an inner surface 12 of the fan cowl 3a.

Figure 3:
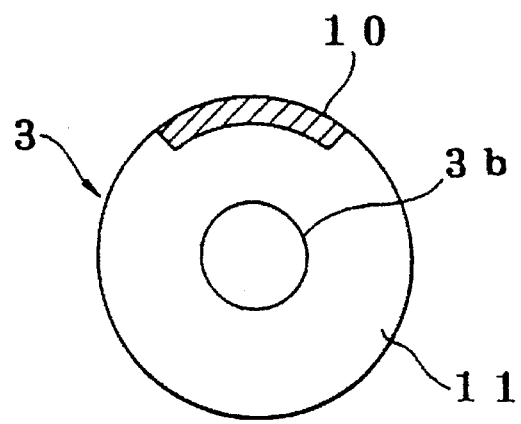
FIG. 3 is a rear view of the nacelle apparatus shown in FIG. 1.

As shown in FIG. 3, the lip-shaped small wing 10 extends from the trailing edge 11 of the fan cowl 3a while maintaining the partial concentric relationship. Provided that it is proven that the contour of the lip-shaped small wing 10 gently varies, the rear edge part of the lip-shaped small wing 10 may assume a flattened contour which extends in the non-concentric relationship.

Figure 4:
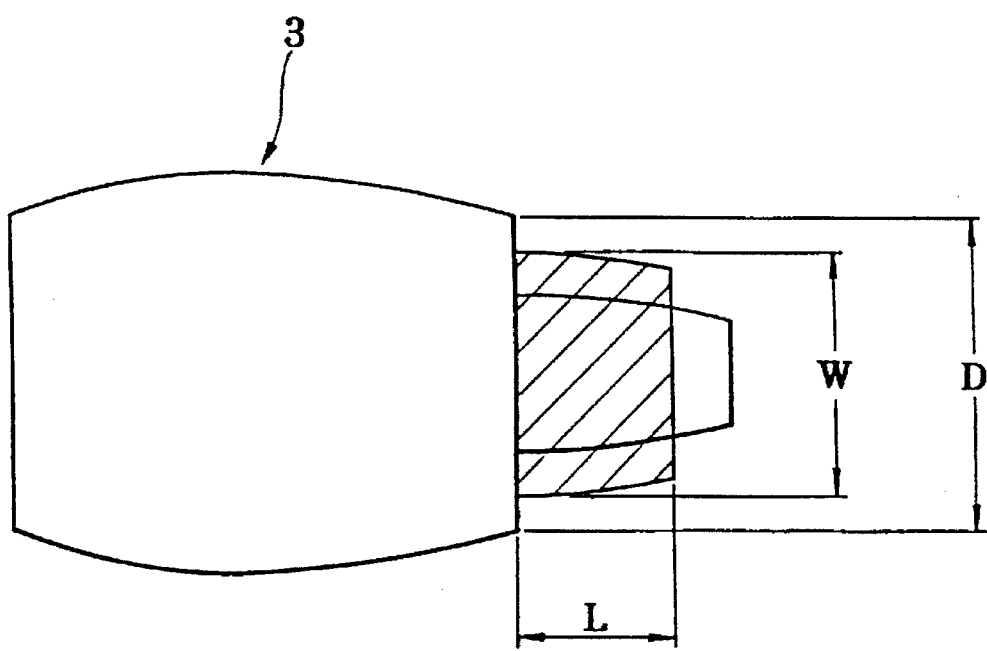
FIG. 4 is a schematic side view of a jet engine including the nacelle apparatus of the present invention, particularly showing dimensions defining the nacelle apparatus.
Figure 3A:
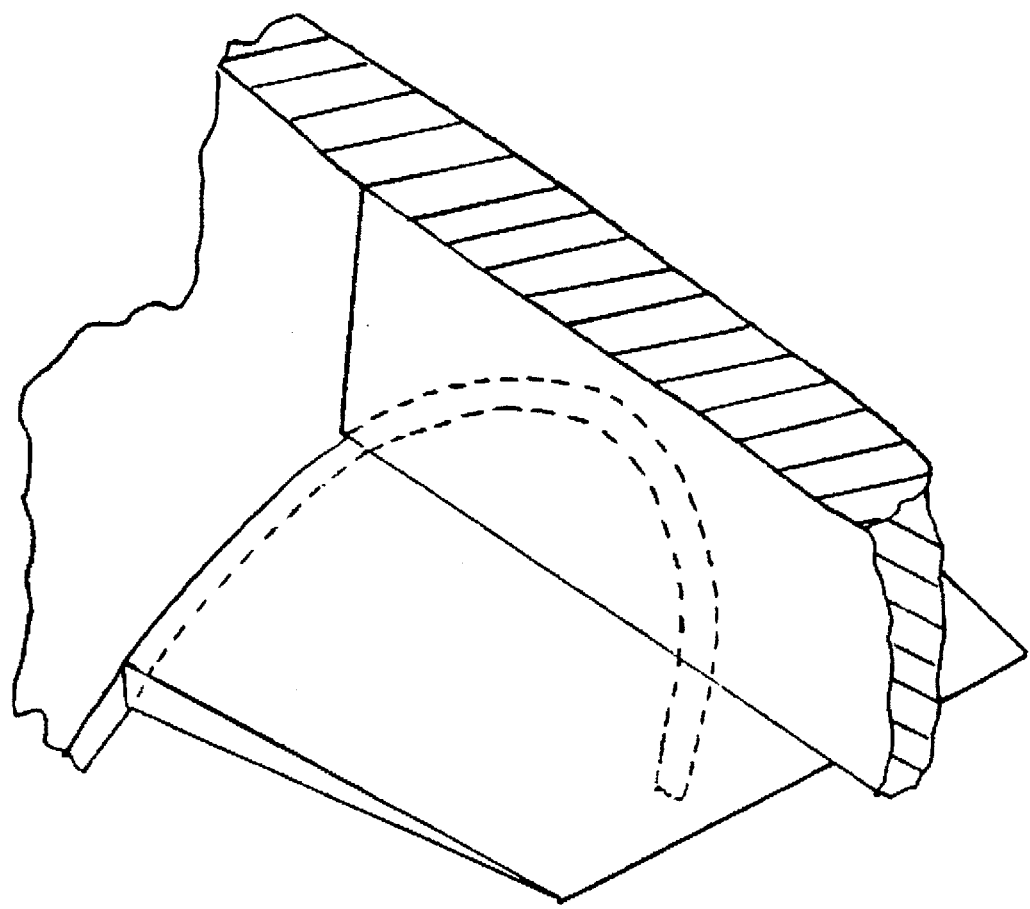

FIG. 4 is a schematic side view of the nacelle 3, particularly showing dimensions of the lip-shaped small wing 10. When it is assumed that a width of the lip-shaped small wing 10, which represents the distance between a first and second exterior side edge of the small wing, is designated by W and a diameter of the trailing edge of the fan cowl 3a dimensionally coincident with the diameter of an exhaust jet opening portion is designated by D, the width W of the lip-shaped small wing 10 is substantially determined to lie within the range defined by $1.0D \leq W \leq 0.5D$. The reason why the width W of the lip-shaped small wing 10 is determined in that way is because it has been found from the results derived from a series of experiments conducted by the inventors that when it is dimensioned to be larger than the diameter D of the trailing edge of the fan cowl 3a, a substantially large effect can not be expected with the lip-shaped small wing 10 but a loss caused by the increasing of a frictional drag attributable to the increasing of an area of the lip-shaped small wing 10 is enlarged and that when it is dimensioned to be smaller than a half of the diameter D, substantial improvement of the lift/drag properties of the nacelle apparatus can not be recognized.

In addition, when it is assumed that a length of the lip-shaped small wing 10 is designated by L and a length of a wing chord as measured at the position coincident with the nacelle 3 of the main wing 1 is designated by C, a maximum value of the length L is determined to assume a value of the length C multiplied by about 0.25 and a minimum value of the same is determined to assume a value of the length C multiplied by about 0.12. The foregoing determination of the length L of the lip-shaped small wing 10 has been made based on the results derived from a series of wind tunnel tests conducted by the inventors. Specifically, when the length L of the lip-shaped small wing 10 is determined to assume a value of the length C of the wing chord multiplied by about 0.25 or more or about 0.12 or less, substantial improvement of the lift/drag properties of the nacelle apparatus can not be recognized.

Figure 5:
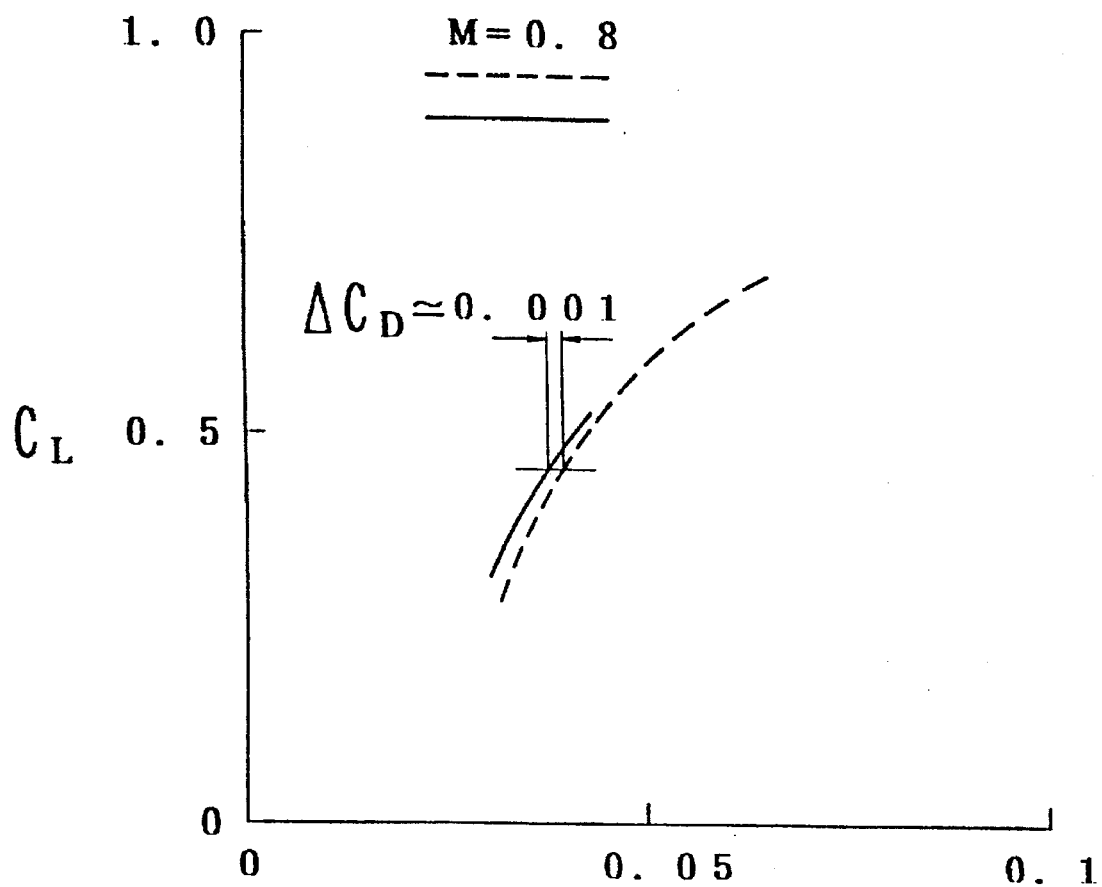
FIG. 5 is a graph which shows an effect of the nacelle apparatus on lift/drag properties of the nacelle apparatus.

FIG. 5 is a graph which shows the relationship between a drag coefficient and a lift coefficient in association with lift/drag properties of the nacelle apparatus based on the results derived from a comparison between the nacelle apparatus of the present invention and the aforementioned conventional nacelle apparatus by conducting a series of power-on type wind tunnel tests each simulating the flowing of exhaust gas through each nacelle. As is apparent from the graph, when the nacelle apparatus including a lip-shaped small wing assumes a certain lift coefficient designated by $C_L$, the drag coefficient of the nacelle apparatus designated by $C_D$ is decreased by a quantity of about 0.001 compared with the conventional nacelle apparatus. The graph shows the results obtained from a series of wind tunnel tests conducted by the inventors on the assumption that an airplane flies at the condition of Mach 0.8. In addition, it has been confirmed based on the results derived from another series of wind tunnel tests conducted by them that the same advantageous effect as mentioned above can be obtained with the nacelle apparatus of the present invention also on the assumption that an airplane flies at a Mach speed of 0.6. In other words, the nacelle apparatus of the present invention assures that an effect of substantial reduction of a magnitude of resistance against actually flying airplane at a high speed can be obtained within a wide Mach number range.

Consequently, it has been confirmed that a magnitude of drag induced by aerodynamic interference of the wing with the nacelle 3 can be reduced by allowing the nacelle 3 to be equipped with the lip-shaped small wing 10.

As described above, the present invention has provided a nacelle apparatus for an airplane of the type having nacelles for jet engines mounted below a main wing via pylons wherein each nacelle include a lip-shaped small wing extending, as shown in FIGS. 1–3, only from an upper portion of the trailing edge of each nacelle to the opposite sides of each pylon in order to improve lift/drag properties of the nacelle apparatus by reducing a magnitude of drag induced by aerodynamic interference of the main wing with the nacelle at a high speed flight condition.

Consequently, according to the present invention, each nacelle can be suspended from the main wing at the position located nearer to the wing, a length of each landing gear and pylon can be shortened, and a weight of the airplane can be reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A nacelle apparatus for enclosing an engine suspended from a wing of an airplane via a pylon, comprising:

a fan cowl connected to a lower and front portion of the pylon for enclosing a front portion of said engine, said fan cowl having a trailing edge formed on an outer and rear peripheral rim of said fan cowl;

a core cowl interposed between said fan cowl and said engine for covering an exhaust tail pipe of said engine; and a small wing connected to the trailing edge of said fan cowl and extending off in an upstream to downstream direction from an upper section of the trailing edge of said fan cowl, and said small wing having an upper surface which is smoothly connected to an upper periphery of said trailing edge of said fan cowl for forming a smooth aerodynamic air flow contact from said fan cowl to a flat trailing edge of said small wing, and a lower surface of said small wing being smoothly connected to a lower periphery of said trailing edge of said fan cowl for forming a smooth aerodynamic air flow contact from said fan cowl to the flat trailing edge of said small wing; and said small wing having an essentially arcuate cross-sectional shape at a front portion connected to the trailing edge of said fan cowl and a flat cross-sectional shape at a rear portion of said small wing, and said trailing edge having a width which is commensurate with that of said front portion connected to said trailing edge such that said small wing provides an improved lift and drag ratio in a compact configuration of the nacelle, pylon and airplane.

2. The nacelle apparatus according to claim 1, wherein said small wing has a chord length L calculated by the following formula:

$$L = A \times C$$

L: the chord length of said small wing
A: a value between 0.12 and 0.25
C: a chord length of the wing of the airplane at an installation point of said pylon; and
said small wing has a span length W calculated by the following formula:

$$W = B \times D$$

W: the span length of area of said small wing
B: a value between 0.5 and 1.0
D: a diameter of the trailing edge of said fan cowl.

3. A nacelle apparatus as recited in claim 1 wherein said small wing extends out away from the trailing edge of the fan cowl a distance L which is of a value that satisfies $(0.12 \times C) \leq L \leq (0.25 \times C)$ with C being a cord length of the airplane wing at an installation point of the pylon.

4. A nacelle apparatus as recited in claim 3 wherein said small wing has a width W, at an intermediate area of its length, of 1.0D>W>0.5D with D being a diameter value for the trailing edge of said fan cowl.

5. A nacelle apparatus as recited in claim 1 wherein said small wing has a width W of $1.0D \leq W \leq 0.5D$ with D being a diameter value for the trailing edge of said fan cowl.

6. A nacelle apparatus as recited in claim 1 wherein the upper and lower surfaces of said small wing extend from a mutual line of connection at the trailing edge thereof and open out to conform to a thickness of the trailing edge of said fan cowl.

7. A nacelle apparatus as recited in claim 1 wherein said small wing is fixedly connected to said fan cowl and has wing portions extending to opposite sides of the pylon, and wherein said small wing has a first and a second side edge spaced off from the pylon and the side edges extending only in an upper portion of the trailing edge of said fan cowl, and said side edges, trailing edge and front portion of said small wing defining an essentially rectangular small wing.

8. A nacelle apparatus for enclosing an engine suspended from a wing of an airplane via a pylon, comprising:
a core cowl for covering the engine;
a fan cowl connected to the pylon for including said core cowl, said fan cowl having a trailing edge and an outer and interior surface;
a small wing connected to and extending off from an upper section of the trailing edge of said fan cowl, said small wing extending to opposite sides of the pylon when said nacelle apparatus is mounted on an airplane, and said small wing having an upper and a lower surface, and said small wing having a front edge, a rear edge and exterior side edges spaced away from the pylon, and said upper surface of said small wing being smoothly connected to an upper peripheral portion of the trailing edge of said fan cowl for forming a smooth aerodynamic air flow contact from said fan cowl to said rear edge, and said lower surface of said small wing is smoothly connected to a lower peripheral portion of the trailing edge of said fan cowl for forming a smooth aerodynamic air flow contact from said fan cowl to said rear edge, and said rear edge of said small wing being essentially of a common length as said front edge so as to form an essentially quadrangular configuration in said small wing such that there is a decrease in an interference resistance of an aerodynamic air flow and an improved aerodynamic lift and drag ratio characteristic which provides for a compact and light weight configuration of the airplane.

9. A nacelle apparatus as recited in claim 8 wherein said upper and lower surfaces of said small wing smoothly reach from a common, linear trailing edge of said small wing to a respective one of the interior and outer surfaces of the trailing edge of said fan cowl.

10. A nacelle apparatus as recited in claim 8 wherein said fan cowl is dimensioned and arranged such that the trailing edge of said fan cowl, when mounted on an airplane, is positioned upstream of a leading edge of the airplane wing, and said small wing is dimensioned and arranged so as to extend to a position downstream of the leading edge of the airplane wing.

11. A nacelle apparatus as recited in claim 8 wherein said fan cowl is dimensioned and arranged such that, when mounted on the airplane, said core cowl has a trailing edge positioned further downstream than the trailing edge of said small wing.

12. A nacelle apparatus as recited in claim 8 wherein the upper surface of said small wing lies flush with the outer surface of said fan cowl so as to form a continuous and uninterrupted surface in said small wing and fan cowl, and wherein said small wing includes a first exterior side edge that extends in an upstream to downstream direction and is spaced away from a first side of the pylon and a second exterior side edge that extends in an upstream to downstream direction and is spaced away from a second side of the pylon, such that said small wing has an essentially rectangular configuration.

13. A nacelle apparatus as recited in claim 8 wherein said small wing extends essentially parallel with the airplane wing so as to be essentially horizontally oriented.

14. A nacelle apparatus for enclosing an engine suspended from a wing of an airplane via a pylon having a fan cowl connected to the pylon for covering a ducted fan and a core cowl interposed between said fan cowl and the engine for covering an exhaust tail pipe of the engine, an improvement of the nacelle apparatus which comprises:
a small wing having a first and a second side edge, a front edge and a rear edge with the front edge connected to an upper trailing edge of said fan cowl and said small wing extending to both sides of said pylon such that said first and second exterior side edges are each spaced away from the pylon with the rear edge and front edge width being essentially the same so as to provide an improved aerodynamic lift and drag ratio characteristic and to attain a compact and light weight configuration of the airplane, and wherein:
said small wing has a chord length L calculated by the following formula:

$$L = A \times C$$

L: the chord length of said small wing
A: a value between 0.12 and 0.25
C: a chord length of the wing of the airplane at an installation point of said pylon; and
said small wing has a span length W calculated by the following formula:

$$A = B \times D$$

W: the span length of said small wing at an intermediate location along its length B: a value between 0.5 and 1.0

D: a diameter of the trailing edge of said fan cowl.

15. A nacelle apparatus for enclosing an engine suspended from a wing of an airplane via a pylon, having a fan cowl connected to the pylon for covering a ducted fan and a core cowl interposed between said fan cowl and the engine for covering an exhaust tail pipe of the engine, an improvement of the nacelle apparatus which comprises:

a small wing connected to an upper trailing edge of said fan cowl and extended to both sides of said pylon for decreasing an interference resistance of an aerodynamic air flow between said nacelle apparatus and the wing so as to improve aerodynamic characteristics of a lift and drag ratio and to attain a compact and light weight configuration of the airplane and wherein said small wing defines a flat plane and rearwardly extends from a trailing edge of said fan cowl, and wherein said small wing has a front edge, a rear edge, and two side edges and said front edge is connected with the trailing edge of said fan cowl so as to provide a smooth air flow surface above and below a connection between said small wing and said fan cowl, and said small wing having a rear edge commensurate in width with said front edge so as to form a small wing that is quadrangular in configuration.

16. An airplane, comprising a wing;

a pylon extending from said wing;

a fan cowl connected to said pylon;

a core cowl positioned within said fan cowl;

said fan cowl having a trailing edge and an outer and interior surface;

a small wing connected to and extending off from an upper section of the trailing edge of said fan cowl, said small wing also extending to opposite sides of said pylon, and said small wing having an upper and a lower surface dimensioned and arranged for aerodynamic air flow contact, and said small wing having a first and a second free side edge spaced away from said pylon and extending in an upstream to downstream direction, and said small wing having a front edge which is connected to and conforms to the shape of the trailing edge of said fan cowl and a rear edge, and said rear edge having a width commensurate with that of said front edge so as to form a quadrangular shaped small wing such that there is a decrease in an interference drag of an aerodynamic air flow and an improved aerodynamic lift and drag ratio characteristic and so as to provide for a compact and light weight configuration of said airplane.

17. An airplane as recited in claim 16 wherein said fan cowl is dimensioned and arranged such that the trailing edge of said fan cowl is positioned upstream of a leading edge of said airplane wing, and said small wing is dimensioned and arranged so as to extend to a position downstream of the leading edge of the airplane wing.

18. An airplane as recited in claim 17 wherein said core cowl is dimensioned and arranged so as to have a trailing edge positioned further downstream from the trailing edge of said small wing.

19. An airplane as recited in claim 16 wherein the upper surface of said small wing lies flush with the outer surface of said fan cowl so as to form a continuous and uninterrupted surface in said small wing and fan cowl, and wherein said free side edges extend only in an upper portion of said fan cowl.

20. An airplane as recited in claim 19 wherein the bottom surface of said small wing lies flush with the inside surface of said fan cowl so as to form a continuous and uninterrupted surface along said small wing and fan cowl.

21. A nacelle apparatus for enclosing an engine suspended from a wing of an airplane via a pylon, comprising:

a fan cowl connected to the pylon, said fan cowl having a trailing edge;

a core cowl positioned between said fan cowl and the engine; and a small wing connected to and extending off in an upstream to downstream direction from an upper section of the trailing edge of said fan cowl, and said small wing having an upper and a lower surface dimensioned and arranged for aerodynamic air flow contact, and said small wing being dimensioned and arranged so as to extend essentially transversely off from a side of the pylon when said nacelle is positioned on an airplane such that there is a decrease in interference resistance of an aerodynamic air flow so as to improve aerodynamic characteristics of a lift and drag ratio and to provide for a compact and light weight configuration of the airplane, and wherein said small wing extends only in an upper portion of said fan cowl, and wherein said small wing has a front edge connected to and conforming in shade to the trailing edge of the fan cowl, and said small wing having two side edges and a rear edge with a width of the rear edge being commensurate with that of the front edge of said small wing so as to define a quadrangular shaped small wing.

22. A nacelle apparatus for enclosing an engine suspended from a wing of an airplane via a pylon, comprising:

a core cowl for covering the engine;

a fan cowl connected to the pylon for including said core cowl, said fan cowl having a trailing edge and an outer and interior surface;

a small wing connected to and extending off from an upper section of the trailing edge of said fan cowl, said small wing extending to opposite sides of the pylon when said nacelle apparatus is mounted on an airplane, and said small wing having an upper and a lower surface dimensioned and arranged for aerodynamic air flow contact, and said small wing having a front edge, a rear edge and exterior side edges spaced away from the pylon such that there is a decrease in an interference resistance of an aerodynamic air flow so as to improve aerodynamic characteristics of a lift and drag ratio and to provide for a compact and light weight configuration of the airplane, and wherein said fan cowl is dimensioned and arranged such that the trailing edge of said fan cowl, when mounted on an airplane, is positioned upstream of a leading edge of the airplane wing, and said small wing is dimensioned and arranged so as to extend to a position downstream of the leading edge of the airplane wing with a trailing edge of the core cowl being positioned further downstream than the trailing edge of said small wing.

23. A nacelle apparatus as recited in claim 22 wherein said upper and lower surfaces of said small wing share a mutual, linear trailing edge and diverge outward to respective interior and outer surfaces of the training edge of said fan cowl.

* * * * *